United States Patent
Goldstein et al.

(10) Patent No.: US 6,561,461 B2
(45) Date of Patent: *May 13, 2003

(54) ORBIT TRANSFER VEHICLE WITH SUPPORT SERVICES

(75) Inventors: David Goldstein, Roslindale, MA (US); Scott A. McDermott, Washington, DC (US); Paul Gloyer, Waveland, MS (US); Richard Fleeter, Reston, VA (US)

(73) Assignee: Aero Astro, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/925,206

(22) Filed: Aug. 9, 2001

(65) Prior Publication Data

US 2003/0010868 A1 Jan. 16, 2003

Related U.S. Application Data

(63) Continuation-in-part of application No. 09/350,813, filed on Jul. 9, 1999, now Pat. No. 6,286,787.

(51) Int. Cl.[7] .................................................. B64G 1/22
(52) U.S. Cl. ................................ 244/158 R; 244/110 D
(58) Field of Search ............................. 244/158 R, 160, 244/113, 172, 169, 173, 110 D

(56) References Cited

U.S. PATENT DOCUMENTS

| | | | | |
|---|---|---|---|---|
| 4,635,885 A | * | 1/1987 | Hujsak | |
| 4,754,601 A | * | 7/1988 | Minovitch | |
| 4,817,895 A | * | 4/1989 | Scott et al. | |
| 4,896,847 A | * | 1/1990 | Gertsch | |
| 4,896,848 A | * | 1/1990 | Ballard et al. | |
| 4,903,918 A | * | 2/1990 | Park et al. | |
| 5,061,836 A | * | 10/1991 | Martin | |
| 5,080,306 A | * | 1/1992 | Porter et al. | |
| 6,267,329 B1 | * | 7/2001 | Chethik | |

* cited by examiner

Primary Examiner—Tien Dinh
(74) Attorney, Agent, or Firm—Robert M. McDermott, Esq.

(57) ABSTRACT

An orbit-transfer vehicle provides the navigation, propulsion, and control systems required to transport a payload satellite from a geosynchronous-transfer orbit (GTO) to a predetermined low-earth orbit (LEO). Upon entering low-earth orbit, the payload satellite is deployed from the orbit-transfer vehicle. To reduce the cost and complexity of the payload satellite, the orbit-transfer vehicle is configured to provide common functional services, such as communications and power regulation, to the payload satellite during the transport, and/or after deployment. To reduce the fuel requirements for this deployment via the orbit-transfer vehicle, a preferred embodiment includes aerobraking to bring the satellite into a low-earth orbit. In a preferred embodiment of this method of deployment, the provider of the orbit-transfer vehicle identifies and secures available excess capacity on launch vehicles, and allocates the excess capacity to the satellites requiring deployment, thereby providing a deployment means that is virtually transparent to the purchaser of this deployment service.

10 Claims, 4 Drawing Sheets

ORBIT TRANSFER VEHICLE WITH SUPPORT SERVICES

CROSS-REFERENCE TO RELATED APPLICATIONS

This is a Continuation-In-Part of U.S. patent application Ser. No. 09/350,813, filed Jul. 9, 1999, now U.S. Pat. No. 6,286,787, issued Sep. 11, 2001 to Richard Fleeter

BACKGROUND OF THE INVENTION

1. Field of the Invention

This invention relates to the field of aerospace, and generally to the deployment of small satellites via an orbit transfer vehicle.

2. Description of Related Art

Satellites, because of their unobstructed fields of view of large areas of the earth, are often the preferred technical solutions to a variety of communications and monitoring problems as well as space and earth science applications. The high cost of satellite deployment, however, often precludes their use from a cost-efficiency viewpoint. In order to distribute the high costs of deployment among a large number of applications or users, the majority of deployed satellites are those that handle a multitude of tasks, or a multitude of customers for the same task. To minimize the loss of available access time to or from the satellite from or to the location on earth being serviced by a satellite, many satellites are placed in geosynchronous orbit. A geosynchronous orbit tracks the revolution of the earth, so that the satellite appears to be fixed over the same area of the earth, thus providing continual access to that area. Due to the physics involved, a geosynchronous orbit is approximately 36,000 kilometers above the earth. To provide reliable communications over this long distance, a geosynchronous satellite requires highly sensitive receivers and/or highly powerful transmitters. Because of the aforementioned economic and technical requirements, geosynchronous satellites generally weigh a ton or more, and cost (in 1999) hundreds of millions of dollars to deploy to the selected geosynchronous orbit.

As contrast to large geosynchronous satellites, the use of small satellites at low-earth orbit (LEO) are becoming increasingly common. U.S. Pat. Nos. 6,128,469, "SATELLITE COMMUNICATION SYSTEM WITH A SWEEPING HIGH-GAIN ANTENNA", issued Oct. 3, 2000 to Fleeter et al; 6,396,819, "LOW-COST SATELLITE COMMUNICATION SYSTEM", issued May 28, 2002 to Fleeter et al.; 6,317,029, "IN SITU REMOTE SENSING", issued Nov. 13, 2001 to Richard Elector; and 6,296,205, "PP INSPECTION SATELLITE", issued Oct. 2, 2001 to Hanson et al. illustrate the use of low cost satellites for a variety of applications, and are incorporated by reference herein. Low-earth orbits are typically hundreds of miles above the earth, rather than thousands of miles. Because of their order of magnitude closer proximity to earth, satellites in low-earth orbit require significantly less communicating and monitoring power and sensitivity than the satellites in geosynchronous orbit. Because they are not stationary above any location on the earth, multiple satellites in low-earth orbit are required to provide continuous coverage of a particular area on earth. Because multiple satellites are required in low-earth orbit to provide continuous coverage, a low-earth orbit satellite system is particularly well suited to applications that employ low cost satellites. As advances continue to be made in electronic circuit density and efficiency, the number of communication and monitoring applications that can be embodied in small, low cost satellites continues to increase.

Deployment of a small, less than five hundred pound, satellite into low-earth orbit typically costs, in 1999 dollars, between seven and ten million dollars. Because a plurality of satellites is required to provide continuous coverage of an area, the overall cost of deploying constellations of low-earth orbit satellites can often amount to hundreds of millions of dollars.

BRIEF SUMMARY OF THE INVENTION

It is an object of this invention to provide a lower cost means for deploying a satellite into orbit. It is a further object of this invention to provide a method for economically brokering the deployment of a satellite. It is a further object of this invention to provide an orbit-transfer vehicle to effectively deploy small satellite systems. It is a further object of this invention to reduce the cost and complexity of small satellite systems.

A launch of geosynchronous satellites typically includes one or two large, multi-ton, satellites that are deployed at the geosynchronous altitude of 36,000 kilometers via a large multistage rocket system, such as an Ariane system. Typically, after allocating the available space and weight capabilities of the rocket system to the primary payload of the one or two large satellites, some excess space and weight allocation remains. For example, if an Ariane launch vehicle can accommodate four tons, and the primary payload satellites are 1½ and 2 tons each, the launch vehicle has an excess capacity of a half ton. Because the marginal cost of adding one or two small satellites is minimal, this excess space or weight capacity can be brokered for the deployment of small satellites at substantially less cost than the primary payload, often less than a quarter of the cost per pound charged to the primary payload satellites.

The expressed objects of this invention, and others, are achieved by providing a means of utilizing the excess space and weight capacity that is typical of a launch of large geosynchronous satellites to deploy small satellites at a low-earth orbit. Specifically, this invention provides a method of deployment of small satellite systems to a target orbit from a geosynchronous-transfer launch vehicle. In a preferred embodiment, an orbit-transfer vehicle provides the navigation, propulsion, and control systems required to transport a payload satellite from a geosynchronous-transfer orbit (GTO) to a predetermined low-earth orbit (LEO). Upon entering low-earth orbit, the payload satellite is deployed from the orbit-transfer vehicle. To reduce the cost and complexity of the payload satellite, the orbit-transfer vehicle is configured to provide common functional services, such as communications and power regulation, to the payload satellite during the transport, and/or after deployment. To reduce the fuel requirements for this deployment via the orbit-transfer vehicle, a preferred embodiment includes aerobraking to bring the satellite into a low-earth orbit. In a preferred embodiment of this method of deployment, the provider of the orbit-transfer vehicle identifies and secures available excess capacity on launch vehicles, and allocates the excess capacity to the satellites requiring deployment, thereby providing a deployment means that is virtually transparent to the purchaser of this deployment service.

BRIEF DESCRIPTION OF THE DRAWINGS

The invention is explained in further detail, and by way of example, with reference to the accompanying drawings wherein.

DETAILED DESCRIPTION OF THE INVENTION

For ease of reference and understanding, this invention is presented using the paradigm of a deployment of a small satellite system to Low-Earth Orbit (LEO), via a Geosynchoronous Transfer Orbit (GTO), although one of ordinary skill in the art will recognize that the principles of this invention are not limited to a GTO-to-LEO transfer.

Figure 1:
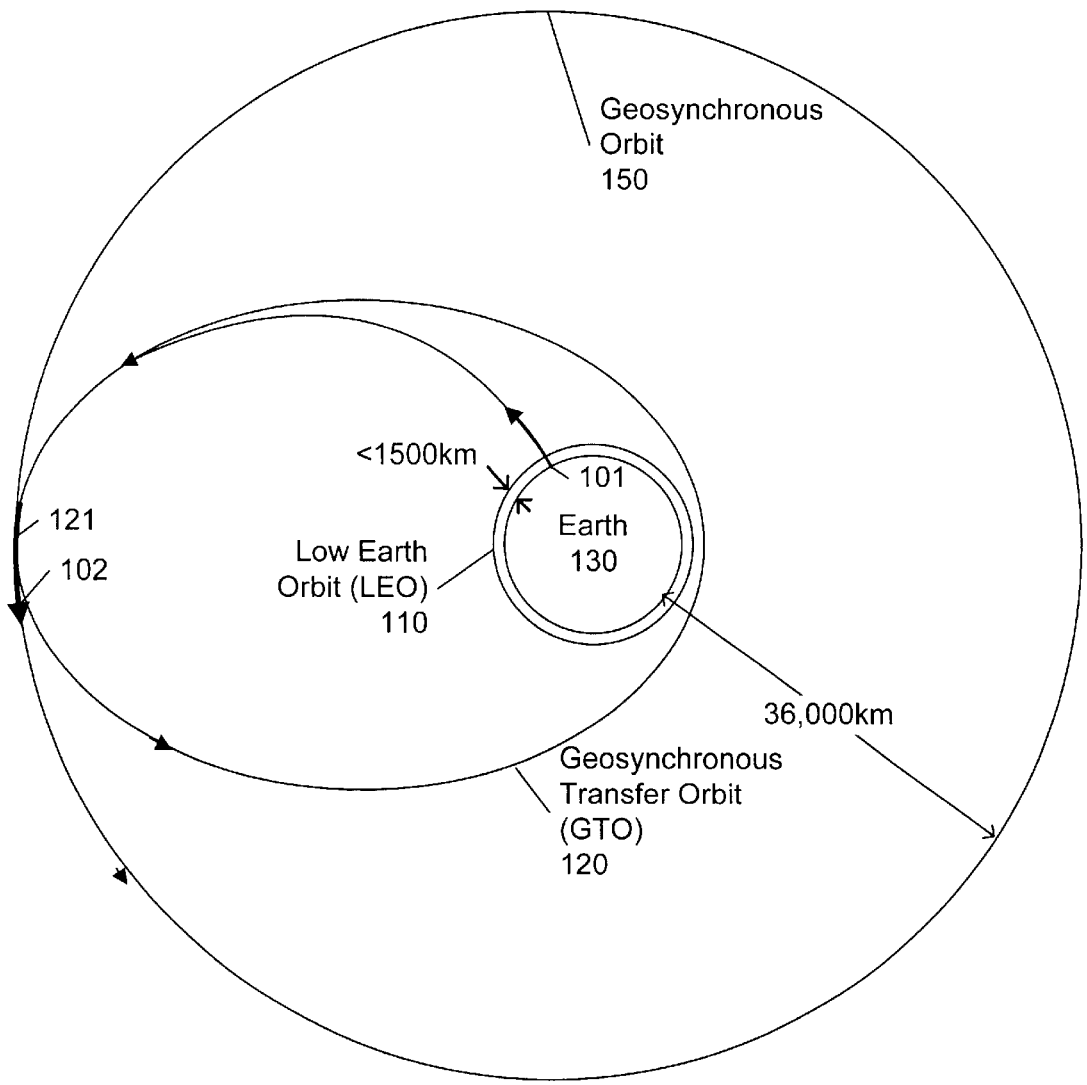
FIG. 1 illustrates a conventional deployment of a geosynchronous satellite via a geosynchronous-transfer launch vehicle.

FIG. 1 illustrates a conventional deployment of a geosynchronous satellite via a geosynchronous-transfer launch vehicle. Note that the figures are presented herein for illustration purposes. Although the relative size of the illustrated orbits are approximately to scale relative to the illustrated size of the earth 130, the specific details of the orbits should not be interpreted as being representative. A geosynchronous-transfer launch vehicle (not shown) containing one or more satellites for deployment to geosynchronous-earth orbit (GEO) 150 is launched 101 from the earth 130. The geosynchronous-transfer launch vehicle is configured to achieve a geosynchronous-transfer orbit 120 whose apogee 121 is tangent to the geosynchronous orbit 150. Some time after achieving the geosynchronous-transfer orbit 120, the one or more geosynchronous satellites (not shown) are released from the geosynchronous-transfer launch vehicle. All items that are released by the geosynchronous-transfer launch vehicle have the same velocity as the geosynchronous-transfer launch vehicle when they are released, and therefore continue to travel in the geosynchronous-transfer orbit 120. Each geosynchronous satellite contains a means for applying thrust 102, preferably at or near apogee 121, to enter an intended tangential geosynchronous orbit 150.

Figure 2:
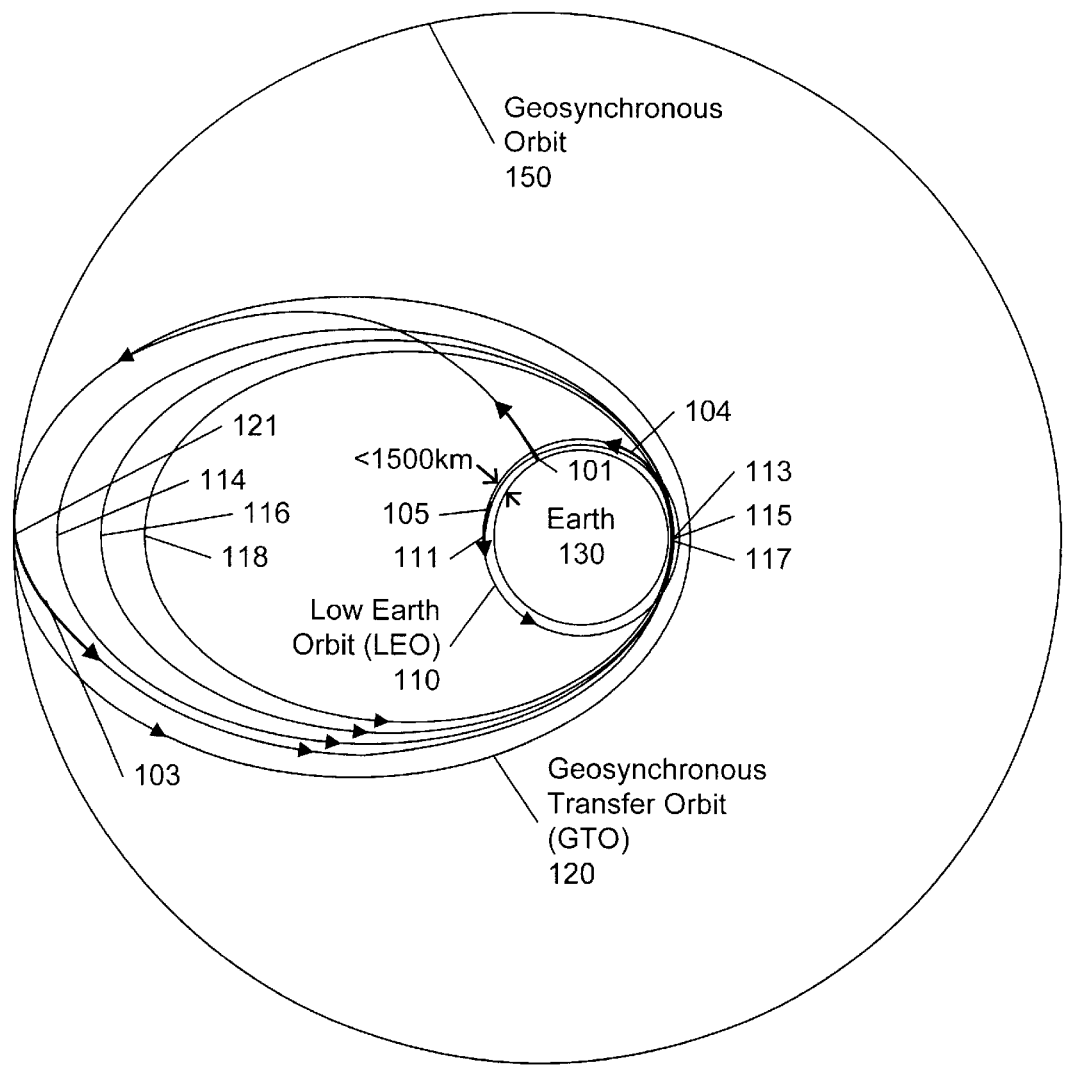
FIG. 2 illustrates an example deployment of a low-earth orbit (LEO) satellite using a geosynchronous-transfer launch vehicle in accordance with this invention.

FIG. 2 illustrates an example method of deploying a low-earth orbit (LEO) satellite using a geosynchronous-transfer launch vehicle in accordance with this invention. As noted above, a geosynchronous orbit 150 is located 36,000 kilometers above the earth 130. A low-earth orbit 110, on the other hand, is located well within 1500 kilometers of the earth 130. The Space Shuttle, for example, typically orbits the earth at an altitude between 160 and 600 kilometers.

In accordance with this invention, an orbit-transfer vehicle (not shown) containing the low-earth orbit satellite (not shown) is launched 101 from the earth 130 via a conventional geosynchronous-transfer launch vehicle (not shown), such as an Ariane. The geosynchronous-transfer launch vehicle releases the orbit-transfer vehicle into geosynchronous-transfer orbit 120. Some time after release, preferably at the apogee 121 of the geosynchronous-transfer orbit 120, the orbit-transfer vehicle fires 103 its integral propulsion device (not shown) to force itself, and the attached low-earth orbit satellite, out of the geosynchronous-transfer orbit 120, and begins a forced descent toward the earth 130. Another firing 104 of the propulsion device can thereafter be used to place the orbit-transfer vehicle directly into a low-earth orbit 110, but such a direct geosynchronous-transfer orbit to low-earth orbit transfer will require a substantial amount of fuel to reduce the kinetic energy of the orbit-transfer vehicle sufficiently to remain in the low-earth orbit 110.

In accordance with an aspect of this invention, aerobraking is used to facilitate the geosynchronous-transfer orbit to low-earth orbit transfer. Aerobraking uses the friction of the earth's atmosphere to reduce the kinetic energy of a spacecraft. Illustrated in FIG. 2, the firing 103 of the propulsion device provides a thrust to force the orbit-transfer vehicle close to the earth 130, at 113. In a preferred embodiment, the firing 103 of the propulsion device is controlled to provide a perigee 113 of under two hundred kilometers above the earth 130. At a nominal 150 kilometer altitude, the atmosphere of the earth is sufficiently dense so as to impart a frictional force that reduces the kinetic energy of the orbit-transfer vehicle, and its attached low-earth orbit satellite. This reduction in kinetic energy results in an apogee 114 of the orbit-transfer vehicle that is less than its original geosynchronous-transfer orbit apogee 121. Upon achieving apogee 114, the orbit-transfer vehicle is drawn toward the earth 130 again, and reaches perigee 115, also nominally 150 kilometers from the earth 130. The friction of the earth's atmosphere at this low altitude again reduces the kinetic energy of the orbit-transfer vehicle, and the resultant apogee 116 is less than the prior apogee 114. Subsequent traversals 117 of the earth's atmosphere will continue to reduce the kinetic energy of the orbit-transfer vehicle, further lowering each subsequent apogee 118. Drogue devices may be attached to the orbit-transfer vehicle to further increase the efficiency of the aerobraking process.

When sufficient kinetic energy is removed from the orbit-transfer vehicle, the decreasing apogee 111 of the orbit-transfer vehicle substantially approaches the altitude of the intended low-earth orbit 110. At this apogee 111, the orbit-transfer vehicle effects the firing 105 of the integral propulsion device to force an ascent of the orbit-transfer vehicle so as to raise the perigee of the orbit-transfer vehicle, and attached low-earth orbit satellite, beyond the earth's atmosphere, thereby preventing further decreases of apogee. The preferred firing 105 places the orbit transfer vehicle, and attached low-earth orbit satellite, into a symmetric low-earth orbit 110, with a perigee that is substantially equal to the apogee 111. In a preferred embodiment of a GTO to LEO transfer, over one hundred aerobraking orbits are made before firing the integral propulsion device at 105. Typically, the orbit-transfer vehicle releases the low-earth orbit satellite at this low-earth orbit 110, and thereafter the low-earth orbit satellite operates independently, as it would have, had it been launched directly from the earth 130 to the low-earth orbit 110. That is, although the low-earth orbit satellite may travel hundreds of thousands of miles to reach an orbit 110 that is only a few hundred miles above the earth's surface, its operation is substantially independent of this rather circuitous deployment scheme. Optionally, as discussed further below, some or all of the components used by the orbit-transfer vehicle may remain with the satellite, to provide services, such as communications and power regulation, to the satellite after deployment.

Figure 3:
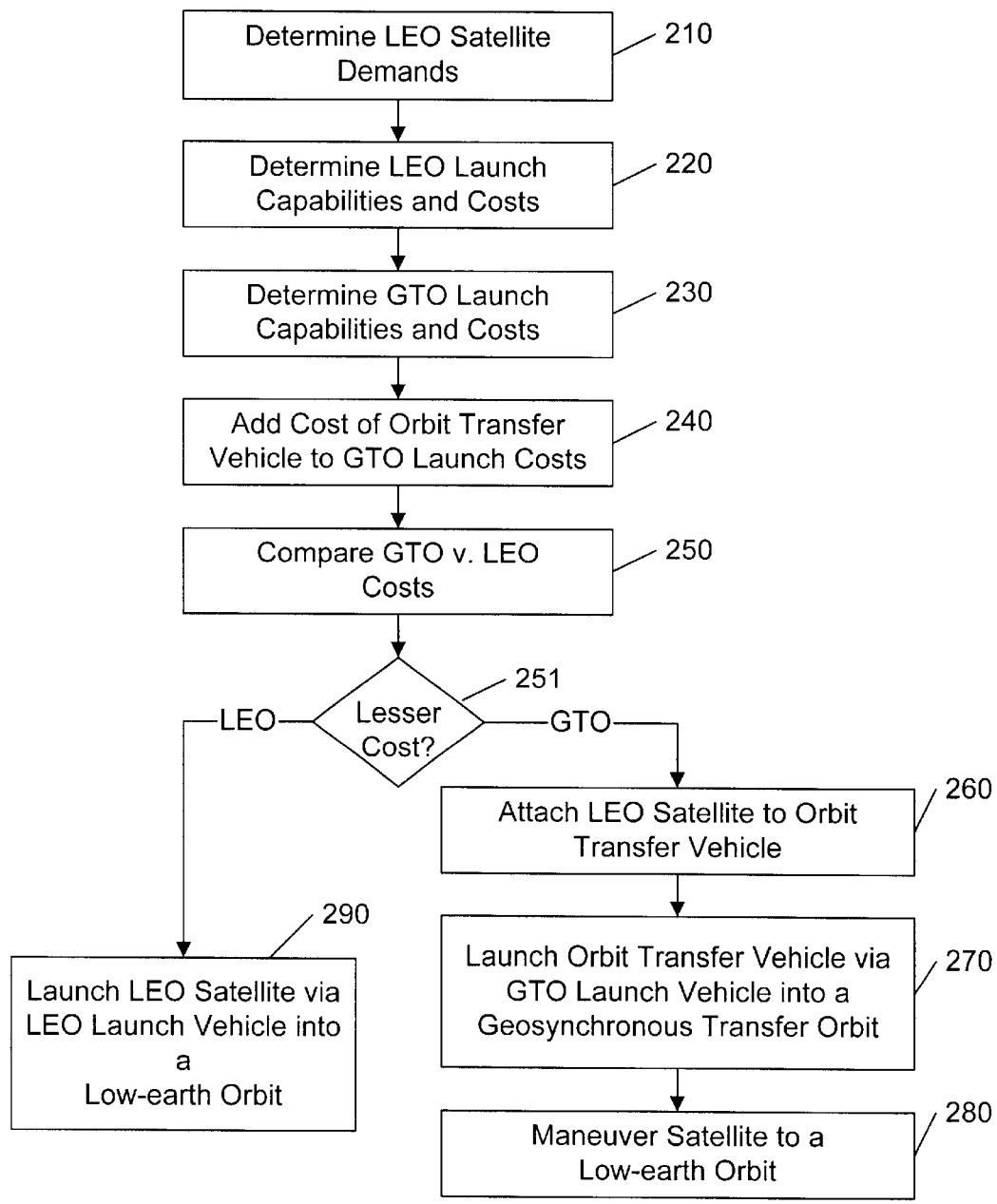
FIG. 3 illustrates an example method of facilitating the use of excess capacity of a launch vehicle for deploying a satellite in accordance with this invention.

Because the deployment methods in accordance with this invention can be effected without affecting the satellite payload, this invention provides a means for brokering lower cost services for the deployment of low-earth orbit satellites. Generally, a satellite is used as a component of a ground-based system, such as a communications network, a research facility, and the like. The user, or owner, of the satellite is not necessarily fluent in the intricacies of rocketry and orbital mechanics. A satellite deployment broker provides the interface services and support between the owner of the satellite and the provider of a launch vehicle. In accordance with the principles of this invention, a satellite deployment broker can extend the range of potential low-earth orbit satellite launch vehicle providers to include geosynchronous-transfer launch vehicle providers having excess capacity. FIG. 3 illustrates, for example, a flow diagram for allocating launch services for low-earth orbit satellite deployments. At 210, the satellite(s) requirements are determined, including the required orbit parameters, the size and weight of the satellite, and so on. At 220, the cost of a conventional low-earth orbit launch that satisfies the requirements are determined or estimated. At 230, the availability of excess capacity on scheduled geosynchronous orbit launch vehicles is determined, and a cost is negotiated for using this excess capacity. The overall cost of deploying the low-earth orbit satellite via a geosynchronous-transfer launch is the cost of using the excess launch capacity of the geosynchronous-transfer launch vehicle plus the cost of the orbit-transfer vehicle for transporting the satellite from the geosynchronous orbit to the low-earth orbit, as determined at 240. If, at 250, the overall cost of the geosynchronous-transfer launch and orbit-transfer is less than the conventional low-earth orbit launch, the deployment is effected by attaching 260 the satellite to the orbit-transfer vehicle and launching 270 the orbit-transfer vehicle with satellite via the geosynchronous-transfer launch vehicle. Thereafter, the orbit-transfer vehicle effects the deployment 280 of the satellite to a low-earth orbit as discussed above. If, at 250–251, the cost of the conventional low-earth orbit launch is less expensive than the geosynchronous-transfer launch, the satellite is deployed 290 via the conventional low-earth orbit launch. Note that a deployment of a constellation of satellites to low-earth orbits in accordance with this invention can involve a combination of low-earth orbit and geosynchronous-transfer launches, depending primarily on the availability and cost of excess capacity on scheduled geosynchronous-transfer launch vehicles.

Figure 4:
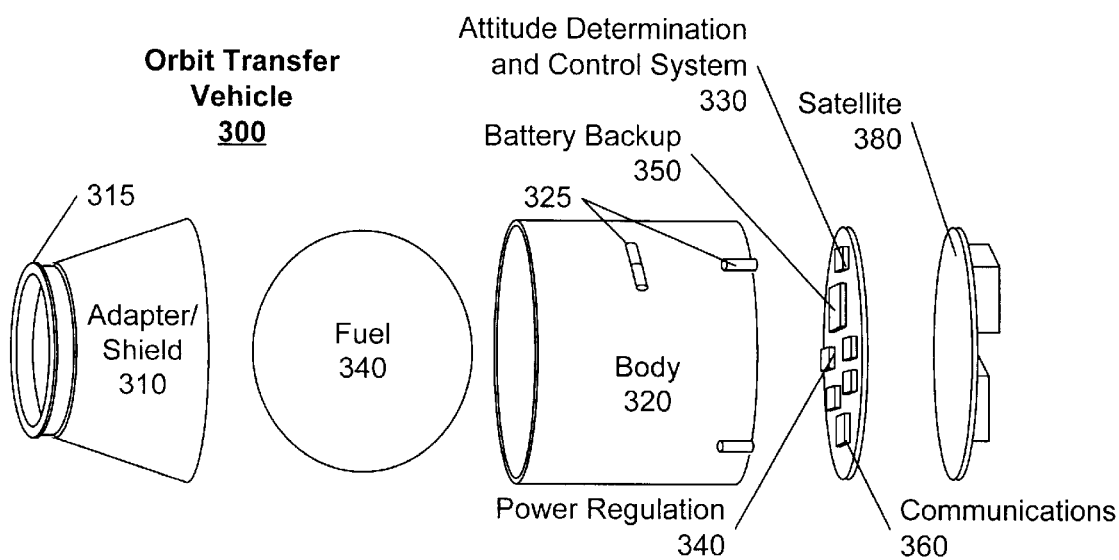
FIG. 4 illustrates an example orbit-transfer vehicle in accordance with this invention.

FIG. 4 illustrates an example orbit-transfer vehicle 300 in accordance with this invention. The example orbit-transfer vehicle 300 includes an adapter element 310 that provides a conventional means 315 for securing the vehicle 300 to the geosynchronous-transfer launch vehicle (not shown), a body element 320 that provides a cavity for holding a fuel cell 340, and a navigation and control system 330 that provides the navigation, propulsion, and control systems required to transport the satellite from a geosynchronous-transfer orbit to a predetermined low-earth orbit. The example orbit-transfer vehicle 300 also includes support system components, such as a power regulation system 340, a battery backup system 350, communications system 360, and so on, discussed further below.

The adapter element 310 and body 320 in a preferred embodiment include shielding to enable the orbit-transfer vehicle 300 to withstand the heat that is induced by the atmospheric friction during aerobraking. The elevation at perigee 113, 115, 117 determines the required degree of shielding. Correspondingly, the elevation at perigee 113, 115, 117 determines the number of aerobraking orbits required to provide a sufficient reduction in the kinetic energy of the orbit-transfer vehicle 300 to achieve a low-earth orbit, given the capacity of the fuel cell 340. Thrusters 325 on the body element 320 effect the thrust required to effect the orbit-transfer, under the control of the navigation and control system 330. A satellite 380 is designed to be mounted within the body 320, and is released from the orbit-transfer vehicle 300 when the appropriate low-earth orbit is achieved. In a preferred embodiment of this invention, the components 330–360 remain with the satellite 380, to provide support services to the satellite 380 when the satellite is deployed, as discussed further below.

Figure 5:
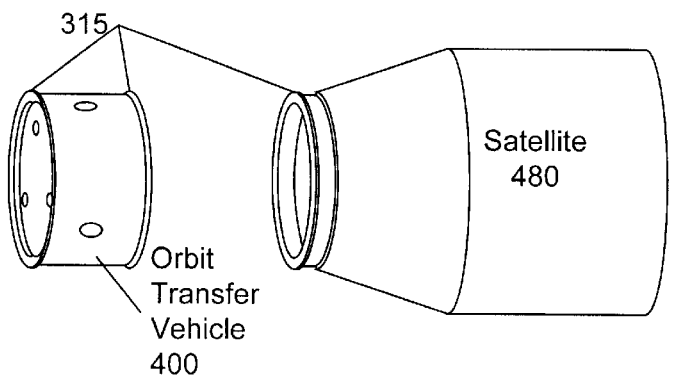
FIG. 5 illustrates an alternative example orbit-transfer vehicle in accordance with this invention.

Alternative arrangements will be evident to one of ordinary skill in the art in view of this disclosure. For example, FIG. 5 illustrates an orbit-transfer vehicle 400 for use with a satellite 480 having an integral body with conventional means 315 for securing the satellite 480 to a launch vehicle (not shown).

U.S. Pat. No. 6,283,416, "A SPACECRAFT KERNEL" issued Sep. 4, 2001 to Richard D. Fleeter and Scott A. McDermott, and incorporated by reference wherein, teaches the use of a kernel system that includes components common to spacecraft operations, with a well defined interface to mission-specific components of a satellite system. Conceptually, the kernel system is provided for common spacecraft functions, independent of the particular mission, and independent of the particular spacecraft configuration. For example, recognizing that communications equipment, power regulation equipment, battery backup systems, and the like, are typically required in any spacecraft, the kernel system of the referenced patent application provides one or more of these functional items.

In a preferred embodiment of this invention, the orbit transfer vehicle includes a kernel system that provides the communications, power management, and other common functions to the transfer vehicle. In accordance with another aspect of this invention, this kernel system is also configured to provide these communications, power management and other common functions to the payload satellite. That is, when the satellite is placed in the target orbit, the kernel is configured to remain with the payload satellite, regardless of whether other components of the transfer vehicle remain with the payload satellite.

In addition to reducing the cost and complexity of the payload satellite by providing these functions, the kernel also serves to provide required functions before the payload satellite is deployed. For example, during the orbit transfer, the orbit transfer vehicle and the payload satellite will typically be subject to substantial temperature variations, particularly if the orbit transfer occurs over an extended time duration. By providing power to the transfer vehicle and the payload satellite, the temperature within each can be properly regulated via the use of heaters or other thermal exchange devices. Similarly, by providing battery-backup power, the transfer vehicle and payload satellite can be powered while solar panels on these devices are obstructed from the sun. Also, the power provided to the satellite can be used to effect a 'wake-up' call to the payload satellite when the satellite is placed in the target orbit.

The communications functions provided by the kernel are used in the transfer vehicle for communicating telemetry information to an earth station, and for receiving commands from the earth station. These commands will typically be provided to control the navigation and control system in the transfer vehicle, but may also be provided to control components in the payload satellite during the transfer period. For example, the payload satellite may be configured to collect data during the transfer period, and the commands from the earth station may control this data collection and/or control the reporting of the collected data to the earth station. Similarly, the status of equipment within the payload satellite may also be reported to the earth station via the communications system, to facilitate the resolution of problems before the satellite is placed in the target orbit.

Extending this concept further, the navigation and control systems of the transfer vehicle may be configured to remain with the payload satellite as well, to provide navigation and attitude control to the payload satellite while it is deployed in the target orbit. Because orbit maintenance generally requires substantially less energy than orbit transfer, providing the fuel required for the navigation and control of the satellite while in orbit amounts to a relatively minor addition to the mass and/or complexity of the transfer vehicle, and eliminates the need to include these functions in the payload satellite as well.

In a preferred embodiment of this invention, the orbit-transfer vehicle is configured to optionally provide these services to a payload satellite. That is, because the communications, power regulation, and other functions are required to effect the maneuvering of the orbit-transfer vehicle, and the cost of providing an interface to these functions is relatively slight, particularly compared to the costs of providing multiple versions of an orbit-transfer vehicle, the preferred embodiment of the orbit-transfer vehicle includes these functions and the interfaces that allow these functions to be used by the payload satellite, regardless of whether the particular payload satellite is configured to use these functions.

Note that the concept of providing functionality to the payload satellite from the orbit transfer vehicle during and after transit can be embodied in any orbit transfer vehicle, regardless of whether the satellite is being transferred from a high-energy to low-energy orbit. Conventional independent low-energy to high-energy orbit transfer vehicles are configured to merely provide propulsion and navigation control to place the payload satellite into the higher-energy orbit. In accordance with this aspect of the invention, the orbit transfer vehicle includes components that are designed to provide services to the payload satellite during the transfer and/or after the satellite is placed in the target orbit, regardless of the direction of orbit-transfer.

Similarly, it will be recognized by one of ordinary skill in the art that the physical and/or logical partitioning of the transfer vehicle and the payload satellite is somewhat arbitrary. For example, the payload satellite may include the aforementioned kernel system, and this kernel system within the payload satellite may provide the power and communications functions to the orbit transfer vehicle. Likewise, the transfer vehicle may be configured to contain some of the common equipment, such as the power regulation system, while the payload satellite is configured to contain other common equipment, such as the communications system. These and other system configurations and optimizations will be evident to one of ordinary skill in the art in view of this disclosure, and are within the spirit and scope of this invention.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. An orbit-transfer vehicle that facilitates the deployment of a payload satellite into a target orbit, comprising
    a navigation and control system that is configured to maneuver the orbit-transfer vehicle and the payload satellite from a launch orbit to the target orbit, the launch orbit having an associated launch-orbit-energy that is higher than a target-orbit-energy associated with the target orbit,
    wherein
        the orbit-transfer vehicle is configured to facilitate:
            an attachment of the payload satellite to the orbit-transfer vehicle, and
            an attachment of the orbit-transfer vehicle to a launch vehicle that is configured to deploy the orbit-transfer vehicle with attached payload satellite to the launch orbit, and
            the orbit-transfer vehicle is configured to provide functional services to the payload satellite for controlled use by the payload satellite.

2. The orbit transfer vehicle of claim 1, wherein the orbit transfer vehicle includes at least one of the following components that is configured to provide the functional services to the payload satellite:
    a communications device,
    a power regulation device,
    an energy storage device,
    a navigation device, and
    an attitude control device.

3. The orbit-transfer vehicle of claim 1, further including
    the payload satellite that is configured to receive the functional services.

4. The orbit-transfer vehicle of claim 1, wherein
    the navigation and control system is configured to provide a thrust that is sufficient to force the orbit-transfer vehicle from the launch orbit into a portion of atmosphere to effect a decrease in kinetic energy of the orbit-transfer vehicle.

5. The orbit-transfer vehicle of claim 4, wherein
    the navigation and control system is further configured to apply thrust to the payload satellite so as to force the payload satellite beyond the atmosphere when the payload satellite substantially reaches apogee at an elevation corresponding to the target orbit.

6. The orbit-transfer vehicle of claim 1, wherein
    at least some components of the orbit-transfer vehicle are configured to be released from the payload satellite when the orbit-transfer vehicle and payload satellite are maneuvered to the target orbit.

7. The orbit-transfer vehicle of claim 1, wherein
    the orbit-transfer vehicle is configured to facilitate communications between an earth station and the payload satellite.

8. The orbit-transfer vehicle of claim 1, wherein
    the orbit-transfer vehicle is configured to provide energy to the payload satellite to facilitate temperature control within the payload satellite.

9. An orbit-transfer vehicle comprising
    a propulsion system that is configured to provide thrust for maneuvering a payload satellite from a higher first orbit to a lower target orbit, and
    a plurality of functional elements that facilitate the control of the propulsion system to facilitate the maneuvering of the payload satellite to the target orbit,
    wherein
        at least one of the plurality of functional elements includes an interface that is configured to provide a corresponding function to the payload satellite for controlled use by the payload satellite.

10. The orbit-transfer vehicle of claim 9, wherein
    the at least one of the plurality of functional elements includes at least one of:
    a communications device,
    a power regulation device,
    an energy storage device,
    a navigation device, and
    an attitude control device.

* * * * *

UNITED STATES PATENT AND TRADEMARK OFFICE
CERTIFICATE OF CORRECTION

| | | |
|---|---|---|
| PATENT NO. | : 6,561,461 B2 | Page 1 of 1 |
| APPLICATION NO. | : 09/925206 | |
| DATED | : May 13, 2003 | |
| INVENTOR(S) | : David Goldstein et al. | |

It is certified that error appears in the above-identified patent and that said Letters Patent is hereby corrected as shown below:

Col. 1, line 8 ADD the following statement to the referenced patent:

This invention was made with U.S. Government support under Contract No. F29601-02-C0008 awarded by the U.S. Air Force. The U.S. Government has certain rights in the invention.

Signed and Sealed this
Eighth Day of November, 2011

David J. Kappos
*Director of the United States Patent and Trademark Office*